(12) United States Patent
Friedmann

(10) Patent No.: US 12,358,114 B2
(45) Date of Patent: Jul. 15, 2025

(54) METHOD FOR OPERATING A HAND-HELD MACHINE TOOL, AND HAND-HELD MACHINE TOOL

(71) Applicant: Hilti Aktiengesellschaft, Schaan (LI)

(72) Inventor: Jan Friedmann, Denklingen (DE)

(73) Assignee: Hilti Aktiengesellschaft, Schaan (LI)

( * ) Notice: Subject to any disclaimer, the term of this patent is extended or adjusted under 35 U.S.C. 154(b) by 400 days.

(21) Appl. No.: 17/774,255

(22) PCT Filed: Nov. 9, 2020

(86) PCT No.: PCT/EP2020/081462
§ 371 (c)(1),
(2) Date: May 4, 2022

(87) PCT Pub. No.: WO2021/099160
PCT Pub. Date: May 27, 2021

(65) Prior Publication Data
US 2022/0388140 A1 Dec. 8, 2022

(30) Foreign Application Priority Data
Nov. 21, 2019 (EP) ..................... 19210583

(51) Int. Cl.
*B25F 5/00* (2006.01)
*B23Q 15/12* (2006.01)
*G05B 19/404* (2006.01)

(52) U.S. Cl.
CPC .............. *B25F 5/00* (2013.01); *B23Q 15/12* (2013.01); *G05B 19/404* (2013.01)

(58) Field of Classification Search
None
See application file for complete search history.

(56) References Cited

U.S. PATENT DOCUMENTS

| 6,111,515 | A | 8/2000 | Schaer et al. | |
|---|---|---|---|---|
| 6,167,324 | A | * | 12/2000 | Gorman ............... B23D 59/001 83/76 |
| 6,518,719 | B1 | 2/2003 | Suzuki et al. | |

(Continued)

FOREIGN PATENT DOCUMENTS

| CN | 101866166 A | 10/2010 |
|---|---|---|
| CN | 101765694 A | 6/2014 |

(Continued)

OTHER PUBLICATIONS

International Search Report of PCT/EP2020/081454, Feb. 5, 2021.
International Search Report of PCT/EP2020/081462, Feb. 5, 2021.
International Search Report of PCT/EP2020/082081, Mar. 2, 2021.

*Primary Examiner* — Ryan A Jarrett
(74) *Attorney, Agent, or Firm* — Davidson Kappel LLC

(57) ABSTRACT

A method for operating a hand-held machine tool including a tool that can be brought into operative connection with a driven shaft, the machine tool having a drive device for actuating the driven shaft, a control device for actuating the drive device and at least one sensor device operatively connected to the control device. The method includes: determining a value of a feed rate of the machine tool using the at least one sensor device; determining a speed value of the driven shaft; determining an output value by means of the control device on the basis of the speed value of the driven shaft and the value of the feed rate; and controlling an output device in a predefined manner and/or controlling the drive device in a predefined manner by means of the control device on the basis of the determined output value. A machine tool is also described.

15 Claims, 1 Drawing Sheet

(56) References Cited

U.S. PATENT DOCUMENTS

| | | |
|---|---|---|
| 6,860,792 B2 | 3/2005 | Krondorfer et al. |
| 2005/0116673 A1 | 6/2005 | Carl et al. |
| 2010/0101862 A1 | 4/2010 | Leue et al. |
| 2010/0264867 A1 | 10/2010 | Iwashita et al. |
| 2015/0148937 A1 | 5/2015 | Wolf et al. |
| 2016/0046035 A1 | 2/2016 | Laghate et al. |
| 2016/0176007 A1 | 6/2016 | Wolf et al. |
| 2016/0375570 A1 | 12/2016 | Boeck et al. |
| 2018/0038546 A1 | 2/2018 | Nishimiya et al. |
| 2018/0358918 A1 | 12/2018 | Erickson et al. |
| 2019/0337109 A1 | 11/2019 | Alberti et al. |
| 2020/0122288 A1 | 4/2020 | Kuhlmann et al. |
| 2020/0122292 A1 | 4/2020 | Kuhlmann et al. |
| 2020/0206887 A1 | 7/2020 | Schmid et al. |

FOREIGN PATENT DOCUMENTS

| | | |
|---|---|---|
| CN | 105051626 A | 11/2015 |
| CN | 105555473 A | 5/2016 |
| CN | 107685315 A | 2/2018 |
| CN | 107976559 A | 5/2018 |
| DE | 102004046000 A1 | 3/2006 |
| DE | 102008055057 A1 | 6/2010 |
| DE | 102013113202 A1 | 5/2015 |
| DE | 10 2015217054 A1 | 3/2017 |
| DE | 102015217053 A1 | 3/2017 |
| DE | 102016216794 A1 | 3/2017 |
| EP | 0588057 A2 | 3/1994 |
| EP | 3391993 A1 | 10/2018 |
| EP | 3391995 A1 | 10/2018 |
| GB | 8310507 A | 12/1983 |
| GB | 2466383 B | 3/2014 |
| JP | 2001138266 A | 5/2001 |
| JP | 2004160822 A | 6/2004 |
| WO | WO 0243920 A1 | 6/2002 |
| WO | WO 2019020165 A1 | 1/2019 |
| WO | WO 2021/099157 A1 | 5/2021 |
| WO | WO 2021/099160 A1 | 5/2021 |
| WO | WO 2021/099221 A1 | 5/2021 |

* cited by examiner

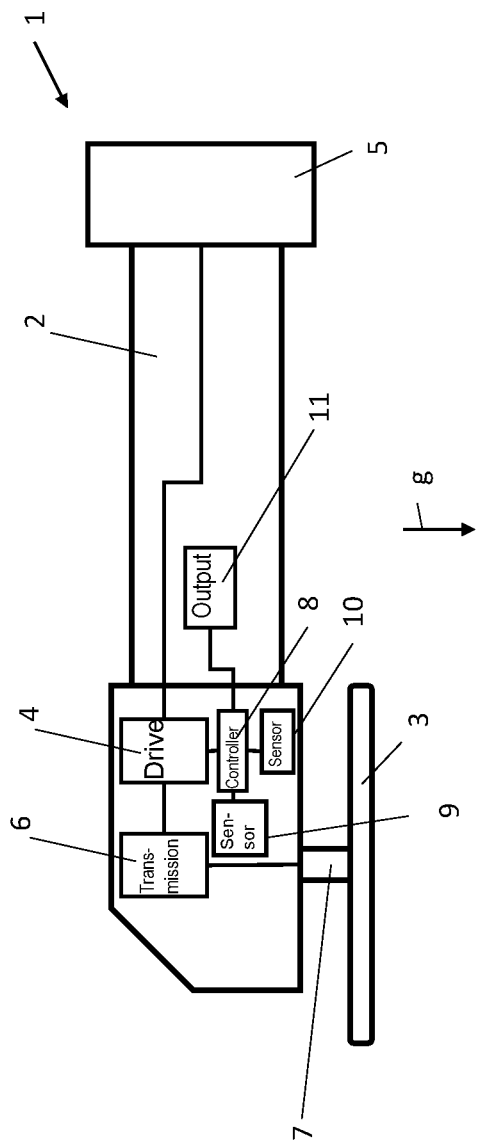

METHOD FOR OPERATING A HAND-HELD MACHINE TOOL, AND HAND-HELD MACHINE TOOL

The invention relates to a method for operating a hand-held machine tool comprising a tool which can be brought into operative connection, in particular rotatably, with a driven shaft, and to a hand-held machine tool for carrying out a method of this kind.

SUMMARY OF THE INVENTION

When using machine tools, for example circular saws or the like, there is the risk that the machine tool is operated in unfavorable operating conditions and that the tool, which is designed, for example, as a saw blade, jams in the workpiece to be machined. This can damage the tool and/or the workpiece. In addition, the machine tool may be operated in the unfavorable operating condition at an undesired operating point.

Is an object of the present invention to provide a method for operating a hand-held machine tool, by means of which method operation of the hand-held machine tool close to an optimal operating point can be achieved in a simple manner and, in particular, damage to a tool that is operatively connected to the machine tool can be reliably prevented in all operating conditions. In addition, an object of the present invention is that of providing a machine tool for carrying out a method of this kind.

The present invention provides a method for operating a hand-held machine tool comprising a tool that can be rotatably brought into operative connection with a driven shaft, the machine tool having a drive device for actuating the driven shaft, a control device for actuating the drive device and at least one sensor device operatively connected to the control device.

According to the invention, the method has the following method steps:
  determining a value of a feed rate of the machine tool in the feed direction using the at least one sensor device;
  determining a speed value of the driven shaft;
  determining an output value by means of the control device on the basis of the speed value of the driven shaft and the value of the feed rate; and
  controlling an output device in a predefined manner and/or controlling the drive device in a predefined manner by means of the control device on the basis of the determined output value.

By means of an embodiment, according to the invention, of a method for operating a machine tool, the hand-held machine tool can be operated at least close to an optimal operating point in a simple manner, and damage to a tool operatively connected to the machine tool can be reliably prevented in all operating conditions. This is achieved by a current operating condition of the machine tool being determined according to the speed value and the value of the feed rate, and by the control device responding to undesired or unfavorable operating conditions by means of predefined control of an output device and associated information transfer to the user or by predefined control of the drive device. If an unfavorable operating condition is present, the machine tool can be quickly converted from the unfavorable operating condition into a favorable operating condition by means of information from the user by a corresponding response from the user or by corresponding control of the drive device. In particular, damage to the tool and/or to the workpiece to be machined can be reliably prevented as a result.

The hand-held machine tool can include both machine tools comprising a tool driven in a rotating movement, such as a sawing machine, in particular a circular saw, a drilling machine, a grinding machine or the like, or a machine tool comprising a tool driven in a different manner, such as a jigsaw, or the like.

The speed value of the driven shaft can be determined, for example, using a sensor device that interacts with the driven shaft, in particular an angle sensor, for example by means of a Hall sensor that interacts with a magnetic disk, or by evaluating a motor current.

It is also possible for a current feed direction of the hand-held machine tool to be determined, this optionally being used by the control device to determine the output value.

In an advantageous embodiment of a method according to the invention, power consumed by the drive device is determined, the control device determining the output value taking into account the power consumed by the drive device. By means of a method of this kind, a current operating condition can be determined particularly precisely, as a result of which damage to the tool or to the workpiece can be prevented particularly reliably.

In order to generate an output value from the determined values, the control device can determine the output value on the basis of a look-up table stored in the control device. Alternatively or additionally, the output value can be determined by the control device by applying an algorithm stored in the control device to the determined speed value and the value of the feed rate.

A distinction between a favorable operating condition and an unfavorable operating condition is possible in a particularly accurate and correct manner if an average rate value is determined from the feed rate values over a defined period of time and this is used by the control device to determine the output value. The average rate value can in particular be determined by using a sliding average value filter for the rate values.

It is possible for optical, acoustic and/or haptic signals to be output by means of the output device, the output signals being dependent on the output value determined by the control device. For example, a color code can be displayed to a user via the output device, for example a green display corresponding to a favorable operating condition and a red display corresponding to an unfavorable operating condition. The user can also be informed via the output device whether a feed rate is too low, has a favorable value or is too high.

In order to be able to prevent damage to the tool and/or to a workpiece particularly reliably, in an advantageous embodiment of a method according to the invention, the control device can control and/or regulate the drive device according to the determined output value. For example, a power output of the drive device is regulated or controlled in accordance with the determined output value such that, for example, a speed of the driven shaft is increased or reduced in accordance with the use.

For example, at least one threshold value for the feed rate, at least one threshold value for the speed of the driven shaft and at least one threshold value for the power consumed by the drive device can be stored in the control device in order to differentiate as precisely as possible between a favorable operating condition and an unfavorable operating condition of the machine tool.

An operating condition in which the value of the feed rate is greater than the corresponding threshold value, the speed value of the driven shaft is greater than the corresponding threshold value and the power consumed by the drive device is greater than the corresponding threshold value can be defined, for example, as a favorable operating condition, so that no change is required.

An operating condition in which the value of the feed rate is less than the corresponding threshold value, the speed value of the driven shaft is greater than the corresponding threshold value and the power consumed by the drive device is less than the corresponding threshold value can be defined, for example, as an unfavorable operating condition, which can be converted into a favorable operating condition, for example, by increasing the feed rate or by reducing the speed of the driven shaft.

An operating condition in which the value of the feed rate is less than the corresponding threshold value, the speed value of the driven shaft is less than the corresponding threshold value and the power consumed by the drive device is greater than the corresponding threshold value can be defined, for example, as an unfavorable operating condition, which can be converted into a favorable operating condition, for example, by reducing the feed rate of the machine tool or by increasing the speed of the driven shaft.

A change in the current operating condition is possible either in an automated manner by corresponding control of the drive device by means of the control device or by means of the user, the control device, with the aid of the output device, providing the user with information about the current operating condition and/or the measures to be taken.

In an advantageous embodiment of a method according to the invention, the at least one sensor device can determine linear acceleration values in each of three spatial directions, the feed rate of the machine tool being determined by integrating the linear acceleration values after eliminating the acceleration due to gravity. In this way, a feed rate and preferably also a feed direction can be determined simply and precisely. In addition to the linear acceleration values, rotation rate values can also be determined by means of the sensor device or by means of a further sensor device. In this way, any rotation of the machine tool that may take place and its influence on a feed movement can also be determined at a point remote from the sensor device, for example an axis of rotation of the tool.

The present invention also provides a hand-held machine tool for carrying out a method described in more detail above, comprising a tool that can be brought into operative connection with a driven shaft, the machine tool having a drive device for actuating the driven shaft, a control device for actuating the drive device and at least one sensor device operatively connected to the control device.

The advantages stated for the method according to the invention also apply, mutatis mutandis, to a machine tool designed according to the invention. With a hand-held machine tool designed according to the invention, a distinction between a favorable operating condition and an unfavorable operating condition is thus possible in a simple and reliable manner, it being possible in particular to reliably prevent damage to a tool operatively connected to the machine tool in all operating conditions as a result.

The hand-held machine tool is in particular a machine tool operated with a substantially linear feed movement, such as a sawing machine, a circular saw, a jigsaw, a drilling machine or the like. In principle, however, it can also include machine tools with a non-linear feed movement, such as a jigsaw, a grinding machine or the like.

Further advantages can be found in the following description of the drawings. An embodiment of the present invention is shown in the drawings. The drawings, the description and the claims contain numerous features in combination. A person skilled in the art will expediently also consider the features individually and combine them to form meaningful further combinations.

BRIEF DESCRIPTION OF THE DRAWING

The only FIGURE in the drawings shows a greatly simplified side view of a hand-held machine tool, which is designed here as an angle grinder, a tool being arranged on a driven shaft of the angle grinder.

DETAILED DESCRIPTION

The FIGURE shows a hand-held machine tool 1 according to the invention, which is designed as an angle grinder in the illustration shown. A hand-held machine tool 1 is understood to mean a machine tool that can be moved substantially freely in space by a user.

According to an alternative embodiment, the hand-held machine tool 1 can also be designed as a machine tool that is operated in a particularly exclusively linear feed movement, this being for example a sawing machine, in particular a circular saw, a drilling machine or the like.

The hand-held machine tool 1, which is designed as an angle grinder in the present case, has a housing 2 and a tool 3, which is designed as a cutting disk, for example. The housing 2 preferably has at least one holding region at which a user can hold and guide the machine tool 1 using one or both hands. The tool 3 can be actuated by a drive, which is in particular designed as an electric motor, or a drive device 4, which can be supplied with current in particular by means of an accumulator 5 that can be connected to the hand-held machine tool 1. According to an alternative embodiment, the hand-held machine tool 1 can also be supplied with electric current from a network by means of a power cable.

The drive 4 for actuating the tool 3 in a rotating movement is arranged in the interior of the housing 2 along with a transmission 6 and a driven shaft 7. The drive 4, which is designed, for example, as an electric motor, the transmission 6 and the driven shaft 7 are arranged in the housing 2 relative to one another and are interconnected in such a way that a torque generated by the electric motor 4 can be transmitted to the transmission 6 and finally to the driven shaft 7. A freely rotating end of the driven shaft 7 that projects downward from the housing 2 is connected to the tool, which is designed here as a cutting disk 3, for example via a clamping device. The torque of the driven shaft 7 can thus be transmitted to the cutting disk 3.

In an alternative embodiment of the invention, it is also possible that the tool is not driven by the drive device in a rotating movement, but is driven, for example, in a linear, oscillating or combined movement or the like, a rotation of a driven shaft in particular being converted into the corresponding movement of the tool.

The hand-held machine tool 1 also has a control device 8 and, in the present case, two sensor devices 9 and 10. The sensor devices 9 and 10 are electrically and electronically connected to the control device 8. Signals can be sent between the sensor devices 9 and 10 and the control device 8. The control device 8 is in turn electrically and electronically connected to the electric motor 4 and the accumulator 5. Signals can be sent between the sensor devices 9 and 10 and the electric motor 4 and the accumulator 5. The control device 8 is used, inter alia, for controlling and regulating the drive 4 and for supplying power to the hand-held machine tool 1.

In the present case, the first sensor device 9 is designed to determine a speed of the driven shaft 7 and is designed, for example, as an angle sensor. The speed values of the driven shaft 7 determined by the first sensor device 9 are transmitted from the first sensor device 9 to the control device 8. Alternatively, it is also possible for speed values of the driven shaft 7 to be determined by evaluating a motor current of the electric motor 4.

In the present case, the second sensor device 10 is designed as a gyro sensor, by means of which the linear acceleration values can be determined in three spatial axes. The linear acceleration values determined by the second sensor device 10 are transmitted from the second sensor device 10 to the control device 8.

The control device 8 is designed to subtract the gravitational acceleration g acting on the machine tool 1 from the determined linear acceleration values such that linear acceleration values corrected by the gravitational acceleration are determined. From these corrected linear acceleration values, rate values can be determined in the spatial axes by integration. A direction of movement of the machine tool 1 with a corresponding movement rate can in turn be determined from these rate values.

Furthermore, a power consumed by the drive device 4 can be determined.

A look-up table is stored in the control device 8, by means of which table a current operating condition of the machine tool 1 is assessed on the basis of the current values determined in each case. For this purpose, the movement rate of the machine tool 1, i.e. the feed rate of the machine tool 1, the speed values of the driven shaft 7 determined by the first sensor device 9 and the power consumed by the drive device 4 are used.

The control device 8 determines accordingly whether a desired operating condition or an undesired operating condition is present. When determining a desired operating condition, no measures need to be taken and the operation of the machine tool 1 can be continued unchanged. In the present case, the control device 8 gives the user feedback via an output device, which is designed here as a display device 11, the display device 11 outputting a green color for this purpose, for example.

If, in contrast, the control device 8 uses the look-up table to determine that there is an undesired operating condition and, for example, the feed rate are too low or too high compared with the current speed values of the driven shaft 7 and the current power consumption of the drive device 7, the control device 8 controls the display device 11 in such a way that the user can see the feed rate that is currently too low or too high compared with the other values. This can be conveyed via a color scale, for example. A position of the current feed rate compared with the other values can also be displayed to the user on a scale, with a range of a feed rate that is too low, a range of a favorable feed rate and a range of a feed rate that is too high each being expressed as a proportion of the other current values.

In addition to the optical output, the output device can also be designed for acoustic, haptic or combined output.

An algorithm can also be stored in the control device 8, which algorithm determines a current operating condition on the basis of the recorded or calculated input values of the feed rate, the speed values of the driven shaft 7 and the power consumption of the drive device 7.

As an alternative or in addition to the control of the output device 11, the control device 8 can also correspondingly control or regulate the drive device 8 on the basis of the determined operating condition of the machine tool 1, in order to achieve a desired operating condition again when an undesired operating condition is present.

In order to define a desired operating condition and an undesired operating condition, at least one threshold value can be provided in the control device 8, for example for the values of the feed rate, the values of the driven shaft 7 and the power consumption of the drive device 4, it being determined, for example on the basis of a matrix stored in the control device 8, when a desired or an undesired operating condition is present for certain combinations of current values relative to the respective threshold values.

Thus, a desired operating condition can be determined, for example, if the current value of the feed rate is greater than the corresponding threshold value, the current speed value of the driven shaft 7 is greater than the corresponding threshold value and the currently consumed power of the drive device 4 is greater than the corresponding threshold value. In this operating condition there is a favorable operating point.

An operating condition in which the current value of the feed rate is less than the corresponding threshold value, the current speed value of the driven shaft 7 is greater than the corresponding threshold value and the currently consumed power of the drive device 4 is less than the corresponding threshold value can be defined, for example, as an unfavorable operating condition. This unfavorable operating condition can also be exited, for example, by increasing the feed rate of the machine tool 1, it being possible for this information to be conveyed to the user via the output device 11. Alternatively, the control device 8 can control or regulate the drive device 4 in such a way that a speed of the driven shaft 7 is reduced.

An operating condition in which the current value of the feed rate is less than the corresponding threshold value, the current speed value of the driven shaft is less than the corresponding threshold value and the currently consumed power of the drive device 4 is greater than the corresponding threshold value can be defined, for example, as an unfavorable operating condition. This unfavorable operating condition can be exited, for example, by reducing the feed rate of the machine tool 1, it being possible for this information to be conveyed to the user via the output device 11. Alternatively, the control device 8 can control or regulate the drive device 4 in such a way that a speed of the driven shaft 7 is increased.

What is claimed is:

1. A method for operating a hand-held machine tool having a tool bring able into operative connection with a driven shaft, the machine tool having a drive for actuating the driven shaft, a controller for actuating the drive and at least one sensor operatively connected to the controller, the method comprising the steps of:
determining a value of a feed rate of the machine tool using the at least one sensor;
determining a speed value of the driven shaft;
determining an output value via the controller on the basis of the speed value of the driven shaft and the value of the feed rate; and
controlling an output device in a predefined manner or controlling the drive in a predefined manner via the controller on the basis of the determined output value, wherein the at least one sensor determines linear acceleration values in each of three spatial directions, the feed rate of the machine tool being determined by integrating the linear acceleration values after eliminating acceleration due to gravity.

2. The method as recited in claim 1 wherein a power consumed by the drive is determined, the controller determining the output value taking into account the power consumed by the drive device.

3. The method as recited in claim 2 wherein the output value is determined by the controller based on recorded or calculated input values of the feed rate, the speed values of the driven shaft and the power consumption of the drive.

4. The method as recited in claim 1 wherein the output value is determined by the controller on the basis of a look-up table stored in the controller.

5. The method as recited in claim 1 wherein the output value is determined by the controller as a function of the determined speed value and the value of the feed rate.

6. The method as recited in claim 1 wherein an average rate value over a defined period of time is determined from the feed rate value and at least one further determined feed rate value, the average rate value being used to determine the output value.

7. The method as recited in claim 1 wherein optical, acoustic or haptic signals are output using the output device, the signals being dependent on the determined output value of the controller.

8. The method as recited in claim 1 wherein the controller controls or regulates the drive according to the determined output value.

9. A hand-held machine tool for carrying out the method as recited in claim 1, the machine tool comprising the tool, the drive, the controller, and the at least one sensor.

10. The hand-held machine tool as recited in claim 9 wherein the at least one sensor is electrically and electronically connected to the controller, the controller being electrically and electronically connected to an electric motor and either an accumulator or electric current from a network via a power cable.

11. The hand-held machine tool as recited in claim 9 wherein the tool is a cutting disk.

12. The hand-held machine tool as recited in claim 9 wherein the machine tool is an angle grinder.

13. The hand-held machine tool as recited in claim 9 further comprising a housing having a holding region.

14. The hand-held machine tool as recited in claim 13 wherein the housing houses the drive, and further comprising a driven shaft for connecting to the tool extending out of the housing.

15. The hand-held machine tool as recited in claim 14 further comprising a transmission between the drive and the driven shaft.

* * * * *